Patented Sept. 20, 1949

2,482,087

UNITED STATES PATENT OFFICE 2,482,087

PROCESS FOR THE POLYMERIZATION OF STYRENE AND MONO-ALLYL MALEATE

Newton C. Foster, Pittsburgh, Pa., assignor to Westinghouse Electric Corporation, East Pittsburgh, Pa., a corporation of Pennsylvania No Drawing. Application December 29, 1945, Serial No. 638,473

4 Claims. (Cl. 260—78.5)

This invention relates to a synthetic resin that is capable of being converted to an infusible and insoluble stage after passing through a thermoplastic solvent soluble stage.

It has been regarded as highly desirable to provide a synthetic resin that passes through a thermoplastic solvent soluble stage and thereafter may be converted to a thermoset infusible and insoluble stage without the evolution of water in the latter stage. High pressure molding equipment, involved processing schedules and other difficulties such as are encountered at present in forming phenolic resins, for instance, would be avoided by a synthetic resin having the properties as above described.

According to the present invention, I have produced a novel synthetic resin which can be reacted to a solvent soluble, thermoplastic intermediate stage. In such condition, the resin is very stable and may be stored for prolonged periods of time either as a powder or in other solid forms, or in solution without deterioration. The solutions of the thermoplastic resin may be applied to various fillers and when subjected to an elevated temperature can be converted into a thermoset state without the evolution of water or other gaseous products. The powdered thermoplastic resin may be molded, extruded or otherwise processed and when subjected to an elevated temperature may likewise be converted into a thermoset product.

The object of this invention is to provide a synthetic resin that passes through an intermediate thermoplastic stage and may thereafter be converted into a thermoset state without the evolution of water or other deleterious products.

Another object of the invention is to provide a synthetic resin which may be dissolved to form a varnish or liquid solution which may be employed as a coating composition.

A still further object of the invention is to provide a synthetic resin for a thermoplastic resinous composition in solid form that may be mechanically processed to a predetermined shape and then converted into an infusible state.

A still further object of the invention is to provide a molded product composed of an infusible and insoluble resin with or without reinforcing fillers or the like.

Other objects of the invention will in part be obvious and will in part appear hereinafter.

The resinous composition of this invention is produced by reacting (A) a liquid polymerizable monomer having the group $H_2C=C<$, and (B) the ester produced by the reaction of substantially one mole of an organic acidic compound selected from the group consisting of ethylene alpha-beta dicarboxylic acids and their anhydrides and one mole of an alcohol having an $H_2C=C<$ group therein. It has been found that by carrying out the reaction between (A) the monomer and (B) the ester at temperatures below 100° C., so that the unsaturated group of the monomer preferentially combines only with the unsaturated group in the acidic compound, there is formed a stable, thermoplastic resinous product. The $H_2C=C<$ group in the alcohol is much less reactive than the unsaturated group in the acidic compound and will not take any substantial part in the reaction with the $H_2C=C<$ group in the monomer.

The thermoplastic resinous composition so produced may be prepared as a powder or it may be put into solution in many common solvents for use as a coating or impregnating composition. Thereafter, the resinous composition by treatment at a temperature of about 125° C. or higher may be converted into a thermoset resin by the mutual reaction of the $H_2C=C<$ groups in the alcohol. The reaction producing the thermoset resin takes place without the evolution of water or other gaseous products and, accordingly, the thermoset product is obtainable without the imperfections and difficulties encountered at the present time in producing thermoset products from numerous other resins such as phenol formaldehyde and the like.

It has been found that numerous liquid polymerizable (A) unsaturated monomers may be employed with satisfactory results in carrying out the invention. Monostyrene, paramethyl styrene, vinyl acetate, vinyl ketone, methyl methacrylate, and parachlor styrene are examples of suitable (A) unsaturated monomers for the practice of the invention.

In producing (B) the ester suitable unsaturated organic acidic compounds are maleic acid, maleic anhydride, fumaric acid, itaconic acid and its anhydrides. Examples of unsaturated alcohols having the group $H_2C=C<$ suitable for reaction with the acidic compound to produce the ester are allyl alcohol, methallyl alcohol, and alpha chlorallyl alcohol.

For the successful practice of the invention, it is critical that the (B) ester should comprise the reaction product of one mole of an alcohol having a $H_2C=C<$ group for each mole of the unsaturated dicarboxylic acid whereby only one $H_2C=C<$ group is present in (B) the ester. Thus, for example, monoallyl maleate should be employed for the reaction with (A) the monomer having a $H_2C=C<$ group instead of diallyl maleate. If diallyl maleate is reacted with monostyrene, for instance, the reaction cannot be carried to and stopped at an intermediate thermoplastic stage, but the reaction is so energetic that it proceeds directly to a thermoset stage.

From about 1 to 10 moles of (A) the unsaturated monomer, such as monostyrene, may be reacted with 1 mole of (B) the ester of the unsaturated dicarboxylic acid and the unsaturated alcohol, such as monoallyl maleate, to produce a satisfactory intermediate, thermoplastic composition.

To reduce the acidity of (B) the ester, it may be desirable to react therewith one mole of a short carbon chain saturated alcohol having no other reactive groups. Thus methanol, ethanol, propanol, butanol, benzyl alcohol and other simple alcohols can be reacted with monoallyl maleate, for instance, to produce a substantially non-acidic ester. With ethanol the product is monoallyl monoethyl maleate.

Reference should be had to the following detailed examples for the practice of the invention:

Example 1

98 parts by weight of maleic anhydride and 58 parts by weight of allyl alcohol were admixed in a closed reaction vessel and heated for one hour at a temperature of 125° C. to produce monoallyl maleate.

If maleic acid or fumaric acid is employed, it will be necessary to bubble nitrogen gas through the reactants or to apply a vacuum or both to remove water generated during esterification. A higher reaction temperature may be required in the latter case. The ester produced will contain some diallyl maleate or fumarate and should be fractioned to remove the diallyl ester.

Example 2

156.1 parts by weight of the monoallyl maleate of Example 1 was admixed with 104 parts by weight of monostyrene and 1.3 parts by weight of benzoyl peroxide and 300 parts by weight of acetone was added. The mixture was refluxed in a reaction vessel fitted with a refluxing column and heated externally for 16 hours at a temperature of about 70° C. A colorless product having the consistency of a heavy syrup was formed. When the product was poured into water with rapid stirring, a fibrous precipitate was produced which, when dried, gave a solid material that could be readily powdered with the fingers. The precipitated product was molded at 150° C. for three minutes. A clear colorless member was produced. The molded resin was very hard. The molded resin was insoluble in acetone. In ethyl alcohol the resin swelled slightly, and was insoluble.

The syrupy product of Example 2 was diluted with acetone to a suitable viscosity and applied to sheets of paper and dried. The solution wet the paper quickly and upon drying, yielded transparent and tack-free impregnated sheets. A plurality of the sheets were superimposed and subjected to pressure for four minutes at 150° C. A laminated structure having excellent mechanical strength was secured.

Example 3

93.5 grams (4 moles) monostyrene
35.0 grams (1 mole) monoallyl maleate
0.6 grams benzoyl peroxide, and
175 cc. of acetone, were mixed and the mixture refluxed for forty-eight hours at a temperature of 70° C. A viscous solution resulted. Alpha-cellulose paper was wetted rapidly by the solution and after drying, the strips of resin impregnated paper were superimposed and molded at pressures of 75 to 100 pounds per square inch at 150° C. for three minutes. A colorless laminate with a surface appreciably less hard than the one described under Example 2 was secured.

Example 4

A mixture of:

| | Parts |
|---|---|
| Maleic anhydride | 98 |
| Methallyl alcohol | 73 | were admixed in a closed vessel and heated at 125° C. to produce monomethallyl maleate.

Example 5

A mixture of:

47 parts (2 moles) of monostyrene
40 parts (1 mole) of monomethallyl maleate
0.6 part benzoyl peroxide and
200 parts acetone was refluxed for 24 hours at about 70° C. to produce a syrupy composition having substantially no color.

The composition of Example 5 was applied to sheets of paper and, after evaporation of the acetone solvent, the sheets were molded at 75 pounds per square inch at 140° C. in 4 minutes into a hard laminate.

In order to provide for an internal plasticizer for the resinous compositions of this invention, it is desirable to admix (B) the ester with (C) the monoester of a saturated aliphatic compound having at least six carbon atoms in a chain and having substantially no other reactive groups therein with the unsaturated acidic compound. For example, one mole of decyl alcohol was reacted with one mole of maleic anhydride to produce monodecyl maleate. The monodecyl maleate was employed according to the following example.

Example 6

(C) 51.2 grams (1 mole) monodecyl maleate
(B) 31.2 grams (1 mole) monoallyl maleate
(A) 41.6 grams (2 moles) monostyrene
0.6 gram benzoyl peroxide, and
175 cc. of acetone were admixed and refluxed for forty-eight hours. A viscous solution of light yellow color was secured. Copper strips were dipped into the solution to form a coating thereon and after air drying were baked at 225° C. for 15 minutes. The copper strips so coated could be repeatedly bent double without cracking of the resin coating.

When (C) the ester of the saturated aliphatic long carbon chain compound and the unsaturated acidic compound is combined with (B) the doubly unsaturated ester sufficient monomer (A) should be present to react with both (B) and (C). As little as $\frac{1}{10}$ mole of (C) the saturated aliphatic ester may be added to each mole of (B) the ester. As an upper limit, about 1 mole of (C) the saturated aliphatic ester of the acidic compound may be added to each mole of (B) the unsaturated ester.

In preparing solutions of the intermediate reaction product, numerous solvents have been found satisfactory. Ethyl alcohol, diacetone alcohol, methyl ethyl ketone, ethyl acetate and numerous other ketones and esters and alcohols may be used. Benzene and toluene have been found to be unsuitable solvents for dissolving the product such as that of Example 2. The solutions may contain from 5% to 60% by weight of the thermoplastic resinous composition.

The thermoplastic resinous composition produced by reacting the (A) monomer and (B) the ester, with or without the plasticizing ester (C), may be applied to sheets of fibrous materials such as, for example, paper, cotton, asbestos, and glass cloth or other fabrics or to various fibrous materials, and after evaporation of the solvent, they will be coated or impregnated with the thermoplastic composition and may thereafter be molded into the laminated products. The pressures necessary to effect molding may be as low as 50 pounds per square inch, up to several hundred pounds per square inch and higher. The extreme pressures required for other thermosetting resins are not necessary since no moisture or other vapors are produced. The molding temperatures may vary from less than 125° C. to 180° C. or even higher. The resins have good heat stability and are not adversely affected even at extremely high molding temperatures.

The resinous compositions resulting from refluxing with a low boiling point solvent may be precipitated by pouring into water or other means to produce a solid fibrous or powdered resinous product. The solid composition may then be admixed with various fillers, such as wood fiber, silica, asbestos fibers, or talc. Dyes, pigments, plasticizers, mold lubricants, and other fillers may be added to the powders either before precipitation or mechanically admixed thereafter. The powders so produced may be molded in conventional heated molds or extruded in heated extrusion presses to form moldings and strips or applied as coatings or coverings to wire or other base material. The extrusion may be carried out at a high temperature for only a brief fraction of a minute to reach the thermoset stage. The compositions may be injection molded.

Small amounts of peroxides, ozonides and other catalysts capable of expediting the reaction of the allyl group may be added to the intermediate thermoplastic compositions to expedite the conversion to the final thermoset condition.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. A liquid coating composition comprising 100 parts by weight of a volatile organic solvent selected from the group consisting of ketones, alcohols and esters boiling below 100° C. and from 5 to 120 parts by weight of a solute composed of the thermoplastic, heat-convertible resinous composition derived by refluxing from 1 to 10 moles of monostyrene with one mole of monoallyl maleate in acetone at a temperature of about 70° C. for from approximately 16 to 48 hours in the presence of benzoyl peroxide, the reaction being so conducted that the unsaturated group in the monostyrene reacts with the unsaturated group in the maleate radical to form a copolymer while the unsaturated allyl group does not react and is available for subsequent reaction.

2. A liquid coating composition comprising 100 parts by weight of a volatile organic solvent selected from the group consisting of ketones, alcohols and esters boiling below 100° C. and from 5 to 120 parts by weight of a solute composed of the thermoplastic, heat-convertible resinous composition derived by refluxing in acetone at a temperature of about 70° C. for from approximately 16 to 48 hours in the presence of a peroxide catalyst (A) from 1 to 10 moles of a polymerizable monomer having a single $H_2C=C<$ group, and (B) 1 mole of the ester produced by the reacting of substantially equimolar proportions of an organic acidic compound selected from the group consisting of ethylene alpha-beta dicarboxylic acids and anhydrides thereof, and an alcohol having from 3 to 4 carbon atoms and a single $H_2C=C<$ group, the reaction being so conducted that the $H_2C=C<$ group in the polymerizable monomer reacts with the unsaturated group in the maleate radical to form a copolymer while the unsaturated $H_2C=C<$ group of the alcohol does not react and is available for subsequent reaction.

3. A liquid coating composition comprising 100 parts by weight of a volatile organic solvent selected from the group consisting of ketones, alcohols and esters boiling below 100° C. and from 5 to 120 parts by weight of a solute composed of the thermoplastic, heat-convertible resinous composition derived by refluxing in acetone at a temperature of about 70° C. for from approximately 16 to 48 hours in the presence of a peroxide catalyst (A) from 1 to 10 moles of a polymerizable monomer having a single $H_2C=C<$ group, and (B) 1 mole of the ester produced by the reacting of substantially equimolar proportions of an organic acidic compound selected from the group consisting of ethylene alpha-beta dicarboxylic acids and anhydrides thereof, and an alcohol having from 3 to 4 carbon atoms and a single $H_2C=C<$ group, and (C) from 0.1 to 1 mole of the ester produced by reacting an organic acidic compound selected from the group consisting of ethylene alpha-beta dicarboxylic acids and anhydrides thereof, and a saturated monohydric alcohol having at least six carbon atoms in a long chain, the reaction being so conducted that the unsaturated group in the polymerizable monomer reacts with the unsaturated group in the maleate radical while the unsaturated $H_2C=C<$ group of the alcohol does not react and is available for subsequent reaction.

4. A liquid coating composition comprising 100 parts by weight of a volatile organic solvent selected from the group consisting of ketones, alcohols and esters boiling below 100° C. and from 5 to 120 parts by weight of a solute composed of the thermoplastic, heat-convertible resinous composition derived by refluxing in acetone at a temperature of about 70° C. for from approximately 16 to 48 hours in the presence of a peroxide catalyst (A) from 1.1 to 20 moles of a polymerizable monomer having a single $H_2C=C<$ group, and (B) 1 mole of the ester produced by the reacting of substantially equimolar proportions of an organic acidic compound selected from the group consisting of ethylene alpha-beta dicarboxylic acids and anhydrides thereof, and an alcohol having from 3 to 4 carbon atoms and a single $H_2C=C<$ group, (C) from 0.1 to 1 mole of the monoester of a saturated aliphatic monohydric alcohol having at least 6 carbon atoms in a chain and with no other reactive groups and the organic acidic compound, the reaction being so conducted that the $H_2C=C<$ group in the polymerizable monomer reacts with the unsaturated group in the maleate radical while the unsaturated H₂C=C< group of the alcohol does not react and is available for subsequent reaction.

NEWTON C. FOSTER.

REFERENCES CITED

The following references are of record in the file of this patent:

UNITED STATES PATENTS

| Number | Name | Date |
|---|---|---|
| 2,160,940 | Britton et al. | June 6, 1939 |
| 2,370,565 | Neher | Sept. 2, 1941 |
| 2,273,891 | Pollack et al. | Feb. 24, 1942 |
| 2,370,565 | Muskat et al. | Feb. 27, 1945 |
| 2,375,960 | Stoops et al. | May 15, 1945 |